US007960684B2

United States Patent
Payne (10) Patent No.: US 7,960,684 B2
(45) Date of Patent: Jun. 14, 2011

(54) SIDE CURED LIGHT-TRANSMISSIVE DISPLAY SYSTEM

(75) Inventor: John T. Payne, San Jose, CA (US)

(73) Assignee: Apple Inc., Cupertino, CA (US)

( * ) Notice: Subject to any disclaimer, the term of this patent is extended or adjusted under 35 U.S.C. 154(b) by 981 days.

(21) Appl. No.: 11/834,486

(22) Filed: Aug. 6, 2007

(65) Prior Publication Data

US 2009/0040790 A1     Feb. 12, 2009

(51) Int. Cl.
*G09G 5/00*     (2006.01)

(52) U.S. Cl. .................... 250/227.26; 345/173; 345/204; 428/690; 40/580

(58) Field of Classification Search ............. 250/227.26; 345/173, 204; 428/690; 40/580
See application file for complete search history.

(56) References Cited

U.S. PATENT DOCUMENTS

| | | | |
|---|---|---|---|
| 5,544,020 | A | 8/1996 | Loeber et al. |
| 5,987,793 | A | 11/1999 | Ebine |
| 7,334,362 | B2 | 2/2008 | Bladt |
| 7,663,612 | B2 * | 2/2010 | Bladt ........................... 345/176 |
| 2004/0247935 | A1 | 12/2004 | Bladt | 
| 2006/0066579 | A1 | 3/2006 | Bladt |

FOREIGN PATENT DOCUMENTS

| | | |
|---|---|---|
| JP | 07271309 A1 | 10/1995 |
| WO | 2004077388 A1 | 9/2004 |
| WO | 2008006375 A1 | 1/2008 |

OTHER PUBLICATIONS

Prichystal, et al., "Invisible Display in Aluminum" in Proc. of SPIE vol. 5713: Photon Processing in Microelectronics and Photonics IV, Jan. 2005, pp. 215-222.
Liu et al., "Industrial applications of ultrahigh precision short-pulse laser processing" in Proc of SPIE vol. 5713: Photon Processing in Microelectronics and Photonics IV, Jan. 2005, pp. 372-386.
Tyrrell, J., "Invisible display lights up metal," Lasers, Optics and Photonics Resources and News, Feb. 17, 2005, pp. 1-2.

* cited by examiner

*Primary Examiner* — Seung C Sohn
(74) *Attorney, Agent, or Firm* — Kramer Levin Naftalis & Frankel LLP (57) ABSTRACT

An invisible, light-transmissive display system with a light resistant material is provided. The light resistant material has a first side and a second side. Substantially invisible holes penetrate between the first surface and the second surface in a predetermined light-transmissive display pattern. The second surface is exposed to a side curing light that is substantially parallel to the second surface at the invisible holes thereadjacent. A light-conducting curable filler is applied into the invisible holes from the first surface. Surfaces of the light-conducting curable filler are cured in the invisible holes at the second surface with the side curing light. The remaining curable filler in the invisible holes is cured.

36 Claims, 6 Drawing Sheets

SIDE CURED LIGHT-TRANSMISSIVE DISPLAY SYSTEM

CROSS-REFERENCE TO RELATED APPLICATIONS

The present application contains subject matter related to a co-pending U.S. patent application Ser. No. 11/456,833 filed Jul. 11, 2006, titled "INVISIBLE, LIGHT-TRANSMISSIVE DISPLAY SYSTEM", and assigned to the assignee of the present application.

The present application also contains subject matter related to a co-pending U.S. patent application Ser. No. 11/551,988 filed Oct. 23, 2006, titled "INVISIBLE, LIGHT-TRANSMISSIVE DISPLAY SYSTEM", and assigned to the assignee of the present application.

TECHNICAL FIELD

The present invention relates generally to device display systems, and more particularly to invisible, light-transmissive display systems that become visible when illuminated from behind.

BACKGROUND ART

In the world of consumer devices, and particularly consumer electronics, there is an ever-present demand for improved appearance, improved functionality, and improved aesthetics. Industrial design has become a highly skilled profession that focuses on fulfilling this need for enhanced consumer product appearance, functionality, and aesthetics.

One area that continually receives great attention for improvement is user displays. Providing crisp, attractive, unambiguous, and intuitively friendly displays and information for the user is very important in many consumer products. However, as consumer products constantly become smaller and smaller, and in some cases more and more complex, it becomes increasingly difficult to present and display user information in a manner that is easy for the user to grasp and understand, but is also in an uncluttered form and appearance that is aesthetically pleasing.

Much of the aesthetic appeal of a consumer product can quickly be compromised if there are too many display elements, or if too much display area is occupied by display elements that are not needed except at particular times. When not needed, these "passive" or unactivated display elements invariably remain visible to the user, even though in the "off" state. This is not only displeasing from an aesthetic standpoint, but it can be an annoying distraction that interferes with detection and understanding of other display elements that need to be observed at a given moment.

Many display elements are illuminated. Some display elements are illuminated continuously; others are illuminated only when appropriate to instruct and guide the user. Display elements that are not continuously illuminated can be distracting, or at least aesthetically objectionable, when not illuminated (when in the off state) because they still remain visible in the display area.

For example, one typical such display element is configured from transparent plastic inserts that penetrate through the metallic case of an electronic device, and are smoothly flush with the outer surface of the case. Oftentimes, a large number of such always-visible display elements leads to a cluttered, confusing, and unattractive appearance. In fact, even a single such element, when not illuminated (i.e., in an inactive state), can become an unattractive blotch on an otherwise smooth and attractive surface.

Less expensive device cases, for example, those made of opaque plastic rather than metal, are often similarly provided with transparent plastic inserts for illuminated display elements. These display elements also conflict with a good aesthetic appearance when they are not illuminated.

Also, prior displays using plastic or glass are less durable than metal and are more subject to breaking or cracking.

Additionally, the separate visible inserts utilized by prior techniques sometimes do not fit perfectly in the holes in which they are inserted or formed. Such imperfect fit can invite entry of liquids, dirt, and so forth, undesirably causing yet another disadvantage.

Thus, a need still remains for commercially feasible device display systems with improved aesthetics that unobtrusively furnish information as appropriate but otherwise do not distract or detract from the user's experience or the device's performance.

In view of ever-increasing commercial competitive pressures, increasing consumer expectations, and diminishing opportunities for meaningful product differentiation in the marketplace, it is increasingly critical that answers be found to these problems. Moreover, the ever-increasing need to save costs, improve efficiencies, improve performance, and meet such competitive pressures adds even greater urgency to the critical necessity that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides an invisible, light-transmissive display system with a light resistant material. The light resistant material has a first side and a second side. Substantially invisible holes penetrate between the first surface and the second surface in a predetermined light-transmissive display pattern. The second surface is exposed to a side curing light that is substantially parallel to the second surface at the invisible holes thereadjacent. A light-conducting curable filler is applied into the invisible holes from the first surface. Surfaces of the light-conducting curable filler are cured in the invisible holes at the second surface with the side curing light. The remaining curable filler in the invisible holes is cured.

Certain embodiments of the invention have other aspects in addition to or in place of those mentioned above. The aspects will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that process or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known system configurations and process steps are not disclosed in detail.

Likewise, the drawings showing embodiments of the system are semi-diagrammatic and not to scale and, particularly, some of the dimensions are for the clarity of presentation and are shown greatly exaggerated in the drawing FIGs.

Similarly, although the views in the drawings for ease of description generally show similar orientations, this depiction in the FIGs. is arbitrary for the most part. Generally, the invention can be operated in any orientation. In addition, where multiple embodiments are disclosed and described having some features in common, for clarity and ease of illustration, description, and comprehension thereof, similar and like features one to another will ordinarily be described with like reference numerals.

For expository purposes, the term "horizontal" as used herein is defined as a plane parallel to the plane or surface of the display, regardless of its orientation. The term "vertical" refers to a direction perpendicular to the horizontal as just defined. Terms, such as "on", "above", "below", "bottom", "top", "side" (as in "sidewall"), "higher", "lower", "upper", "over", and "under", are defined with respect to the horizontal plane.

Figure 1:
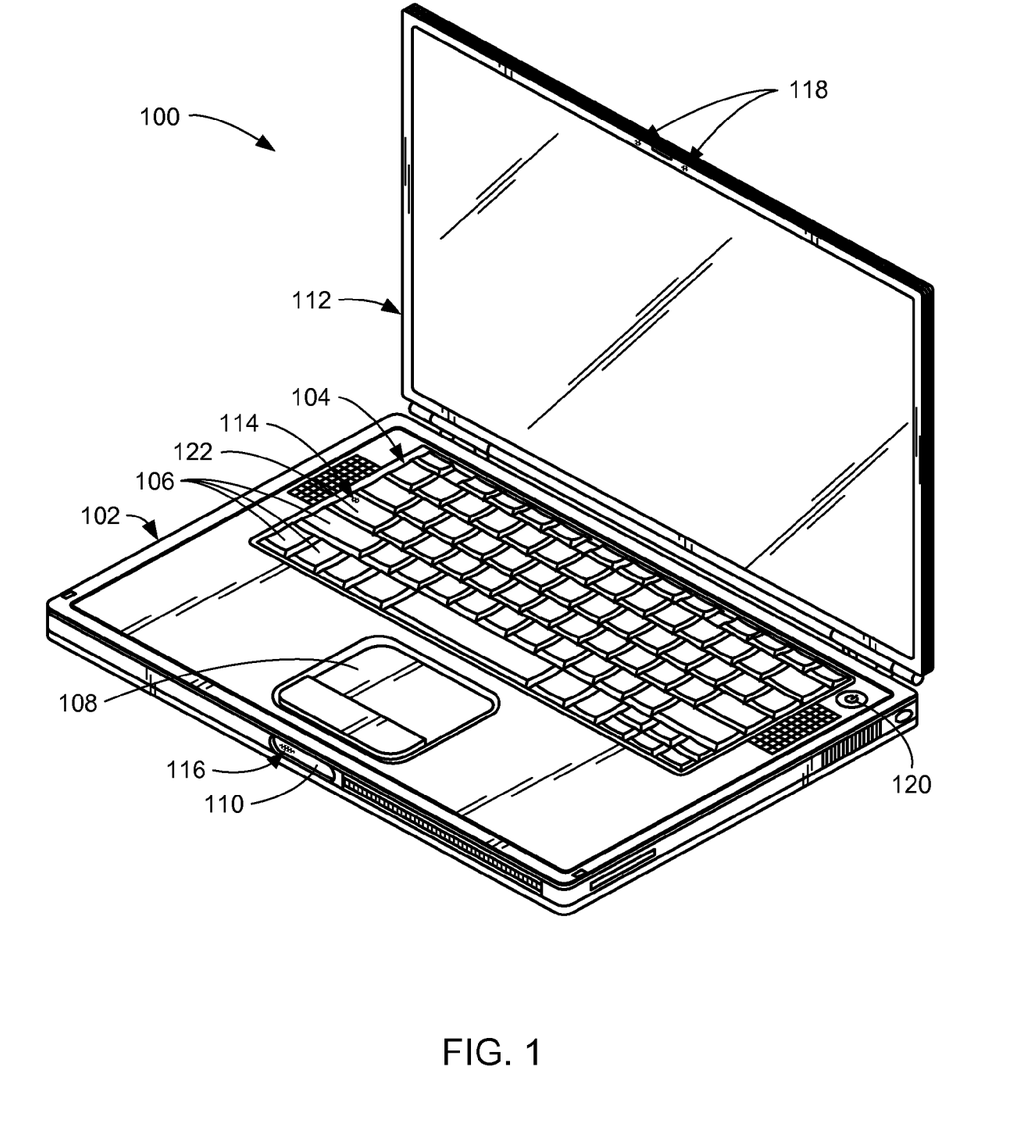
FIG. 1 is a view of a portable computer incorporating an invisible, light-transmissive display system according to the present invention.

Referring now to FIG. 1, therein is shown a portable computer 100 having a housing base 102 that supports a keyboard 104 having keys 106, a touchpad 108, a release latch 110, and so forth. The housing base 102 also supports conventional components (not shown) such as a power supply, a microprocessor ("CPU"), a computer memory, a hard drive ("HD"), an optical disk drive ("ODD"), and so forth. A display 112 is hingedly attached to the housing base 102, and when closed is retained in place by the release latch 110.

The portable computer 100 has several status indicators according to the present invention, as will be described in further detail below. These status indicators include, for example, a caps lock indicator 114, a sleep indicator 116, status indicators 118, a power button 120, and so forth. The caps lock indicator 114 is located in the caps lock key 122 of the keyboard 104 to indicate when the caps lock function of the keyboard 104 has been engaged. The sleep indicator 116 is located in the release latch 110 to indicate when the portable computer 100 has been engaged in a sleep mode. The status indicators 118 may be used to provide information concerning the status of any function or activity assigned thereto, for example, wireless link status, video camera status, low battery, battery charging, hard drive activity, and so forth. Similarly, the power button 120 can be illuminated to indicate that the computer is powered on, or may be illuminated upon opening the display 112 to assist in locating the power button 120, and so forth.

In prior computer configurations and designs, these various status indicators are ordinarily visible to the user in both the activated (or "on") and the inactivated (or "off") states. In the on state, an indicator will characteristically be illuminated continuously or periodically (e.g., cyclically), sometimes with a particular informational color according to the status that the indicator is reporting. In the off state, the indicator will typically be darkened (inactivated or unilluminated), but unfortunately (in many circumstances) can nonetheless still be seen. In the off state, therefore, the indicator often distracts and/or spoils the aesthetics of the portable computer 100.

In contrast, it is believed that a majority of consumers would find the portable computer 100 to be more attractive if status indicators of this sort became invisible in the off state. Of course, it will also be appreciated that there are other circumstances in which an indicator, such as a logo, would preferably remain visible even when in the off state, and circumstances of that sort are also addressed hereinbelow.

Concerning status indicators that would ideally not be visible (i.e., would disappear) in the off state, a principal difficulty faced by previous techniques is that such status indicators are ordinarily located in a partially or completely opaque display surface area. For the status indicator to function, therefore, the surface is interrupted at the status indicator location so that the light from the status indicator can be externally visible to the user. The consequent visible discontinuity in the appearance of the surface is therefore always visible to the user, whether the indicator is on or off.

Figure 2A:
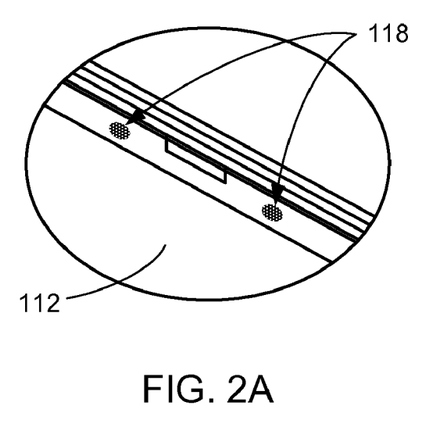
FIG. 2A is an enlarged detail from FIG. 1 of status indicators shown in an illuminated state.

Referring now to FIG. 2A, therein is shown an enlarged detail from FIG. 1 of the status indicators 118 according to the present invention. The status indicators 118 are illustrated in the on or illuminated and visible state.

Figure 2B:
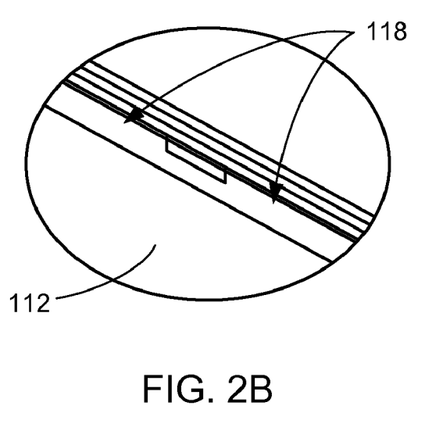
FIG. 2B is a view similar to FIG. 2A in which the status indicators are in an unilluminated state.

Referring now to FIG. 2B, therein is shown a view similar to FIG. 2A in which the status indicators 118 are in the off or unilluminated state. As can be seen, the status indicators 118 in the off state have become invisible. The surface of the display 112 in which the status indicators 118 are located is smooth, continuous, uncluttered, and uninterrupted.

Figure 3A:
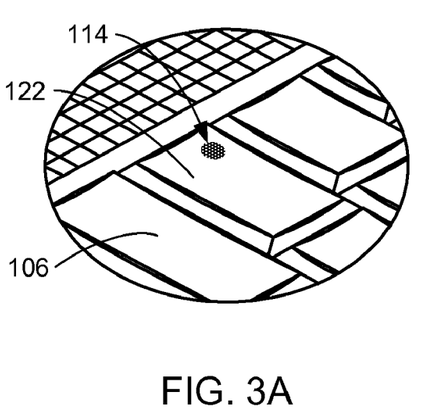
FIG. 3A is an enlarged detail from FIG. 1 of the caps lock indicator shown in an illuminated state.

Referring now to FIG. 3A, therein is shown an enlarged detail from FIG. 1 of the caps lock indicator 114 according to the present invention. The caps lock indicator 114 is illustrated in the on or illuminated and visible state.

Figure 3B:
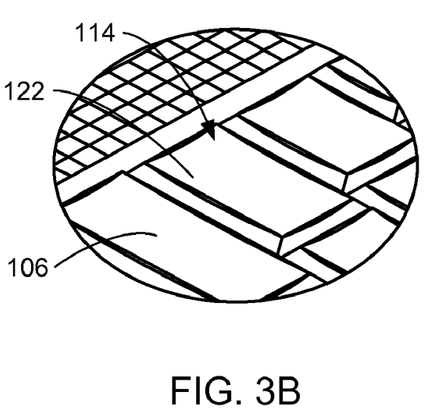
FIG. 3B is a view similar to FIG. 3A in which the caps lock indicator is in an unilluminated state.

Referring now to FIG. 3B, therein is shown a view similar to FIG. 3A in which the caps lock indicator 114 is in the off or unilluminated state. As can be seen, the caps lock indicator 114 in the off state has become invisible. The surface of the caps lock key 122 in which the caps lock indicator 114 is located is smooth, continuous, uncluttered, and uninterrupted.

Figure 4A:
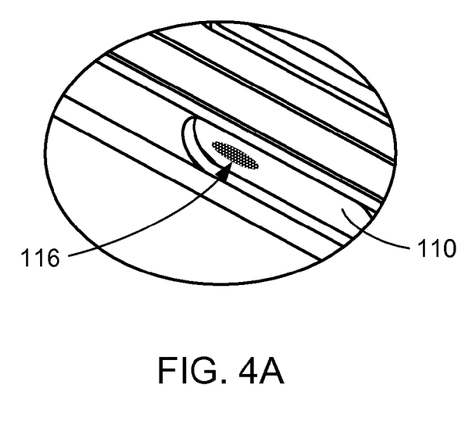
FIG. 4A is an enlarged detail from FIG. 1 of the sleep indicator shown in an illuminated state.

Referring now to FIG. 4A, therein is shown an enlarged detail from FIG. 1 of the sleep indicator 116 according to the present invention. The sleep indicator 116 is illustrated in the on or illuminated and visible state.

Figure 4B:
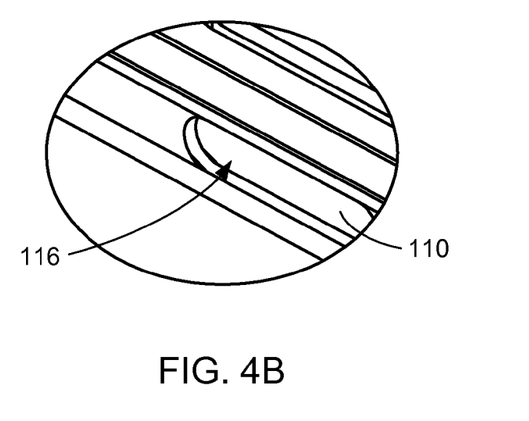
FIG. 4B is a view similar to FIG. 4A in which the sleep indicator is in an unilluminated state.

Referring now to FIG. 4B, therein is shown a view similar to FIG. 4A in which the sleep indicator 116 is in the off or unilluminated state. As can be seen, the sleep indicator 116 in the off state has become invisible. The surface of the release latch 110 in which the sleep indicator 116 is located is smooth, continuous, uncluttered, and uninterrupted.

The status indicators 118, the caps lock indicator 114, the sleep indicator 116, and other desired display patterns that disappear in the off state, form "ghosted field" display patterns that appear and disappear (like ghosts) when turned on and off. As explained in greater detail hereinbelow, such invisible, light-transmissive display systems can be provided for viewing at an outer surface of a light resistant material. Such a light resistant material may be, for example, a substantially opaque material such as metal, or a light-absorbing but translucent material such as colored plastic, or a coated or painted material, or material of other appropriate composition and configuration. As used herein, therefore, "light resistant" refers to some degree of light attenuation, up to and including complete opacity.

Invisible holes are then penetrated in one or more desired light-transmissive display patterns through at least a portion of the light resistant material to provide the ghosted field display patterns.

Figure 5:
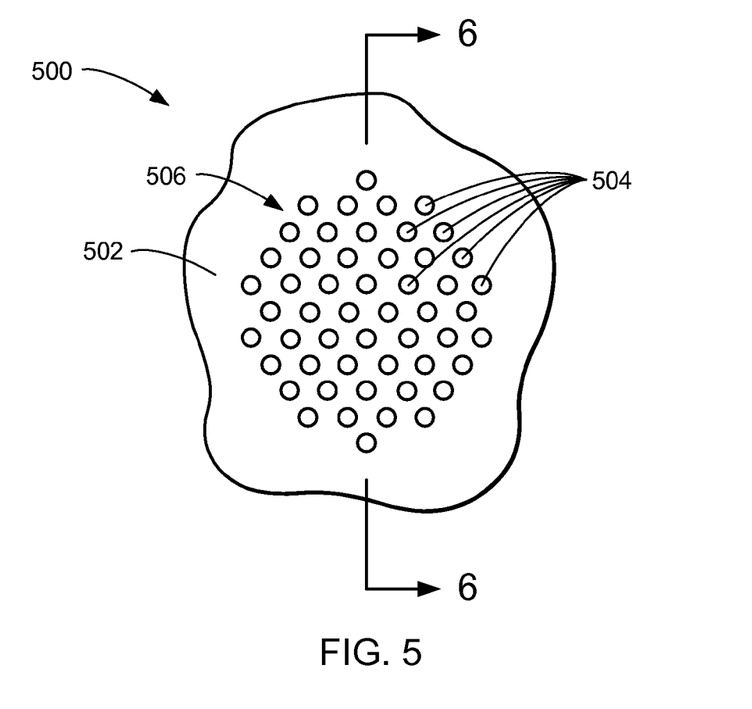
FIG. 5 is an enlarged view of a fragment of light resistant material having an opaque outer surface and incorporating an invisible, light-transmissive display system according to the present invention.

Referring now to FIG. 5, therein is shown an enlarged view of a fragment 500 of light resistant material having an opaque outer surface 502 according to an embodiment of the present invention. In one embodiment, the opaque outer surface 502 is the outer surface of a metallic sheet of aluminum. Holes 504 are formed in and penetrate through the opaque outer surface 502 to the opposite or inner side (i.e., inner surface 702 shown in FIG. 7) of the fragment 500.

The holes 504, although shown greatly exaggerated in the drawing figures, are actually invisible. That is, each of the holes 504 is smaller than resolvable by an unaided human eye. For example, the limit of resolution for the human eye is about 0.1 mm at a distance from the eye of 1 meter. In children, the resolution might be somewhat finer, for example, 0.04 mm. Thus, depending upon the anticipated viewer and viewing distance, the holes 504 will be selected to be below the limit of resolution, and it will accordingly be understood that the term "invisible hole" refers to this upper limit. Thus, as defined herein, "invisible holes" refers to holes that are smaller than resolvable by an unaided human eye.

Conversely, it will be understood that the term "visible holes" refers to holes that are large enough to be resolvable by an unaided human eye.

As depicted in FIG. 5, the holes 504 are arranged in a pattern 506 that forms a status indicator shaped as a circle or dot. For expository reasons, just as the holes 504 are shown greatly exaggerated in size, so also is the size of the pattern 506 greatly exaggerated. Typically, however, the pattern 506 will be large enough to be seen (when illuminated) by the unaided human eye—such as of the size of conventional status indicators.

In one embodiment in which the holes 504 are utilized to form status indicators for a portable computer such as the portable computer 100 (FIG. 1), the holes 504 have a diameter of 0.02 mm. Spacings between the holes 504 are a distance of 0.18 mm. The size of the status indicator pattern itself (e.g., the pattern 506) varies from a fraction of a mm to several mm across, depending upon the actual pattern that is depicted.

Figure 6:
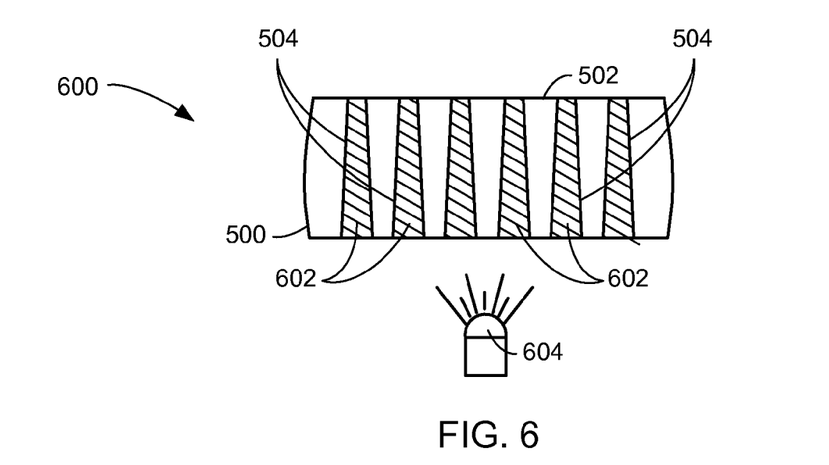
FIG. 6 is a cross-sectional view of the fragment shown in FIG. 5.

Referring now to FIG. 6, therein is shown a cross-sectional view 600 of the fragment 500, taken on line 6-6 in FIG. 5. In this embodiment, a clear coat 602 fills the holes 504. A light source such as a light 604 is configured for providing light to be transmitted through the holes 504 when the pattern 506 (FIG. 5) status indicator is actuated to the on state.

It has been discovered that the clear coat 602 provides several aspects. For example, it closes and seals off the holes 504, protecting them from ingress of dirt, oil, and other contaminants that might degrade the light transmissivity thereof. The outer surface is thus secured in case of exposure to contamination.

The clear coat 602 can also be modified or adjusted to provide desired effects concerning the light that is being transmitted through the holes 504. For example, the clear coat 602 may be provided with a desired color, such as by incorporating a corresponding color, dye, or fluorescent dye thereinto. Alternatively or additionally, particles may be provided or incorporated into the clear coat 602. Such particles may also be colored to provide various desired effects with regard to the color qualities of the light issuing from the holes 504. These particles may include, for example, nano-size reflective metallic particles, silicon particles, mica particles, fluorescent particles, and so forth. Such particles are advantageous, for example, when it is desired to disperse the light emanating from the holes 504 over a wider viewing angle.

Figure 7:
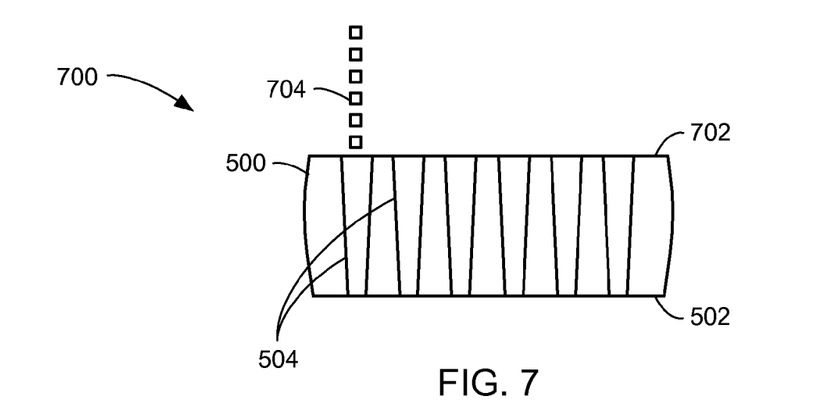
FIG. 7 is an inverted cross-sectional view of the fragment shown in FIG. 5 in an early stage of manufacture.

Referring now to FIG. 7, therein is shown an inverted cross-sectional view 700 of the fragment 500 in an early stage of manufacture, taken on line 6-6 in FIG. 5. In this stage of manufacture, the holes 504 have been formed, for example with a laser drill 704, and the fragment 500 has been cleaned with air or isopropanol ultrasonic and dried. The holes 504 are conical and extend from an inner surface 702 to the opaque outer surface 502.

In a previous technique, the next steps involved application of a UV curable clear coat to the (uninverted) opaque outer surface 502 followed by UV curing from the inner surface 702 after the clear coat penetrated through the holes 504. The UV curing was performed by exposing the UV curable clear coat to a UV light. When the curing was completed, small fingers of cured clear coat remained sticking up on the surface opposite the surface toward which the UV light had been directed. The fingers were formed from clear coat that was cured by the UV light that had shined outwardly from the holes. The fingers of clear coat were then broken off and wiped away. When the fingers were broken off, they would form either very smooth surfaces or very cracked and faceted surfaces. As a result, clear coat in holes with smooth surfaces would conduct visible light more efficiently than clear coat in holes with cracked and faceted surfaces. Thus, the cracked surfaces led to a lower intensity and homogeneity of the transmitted visible light, degrading the uniformity of visible light between holes.

The systems of the present invention overcome the disadvantages of previous techniques. They also provide new versatility, options, and capabilities not achievable with previous techniques.

Figure 8:
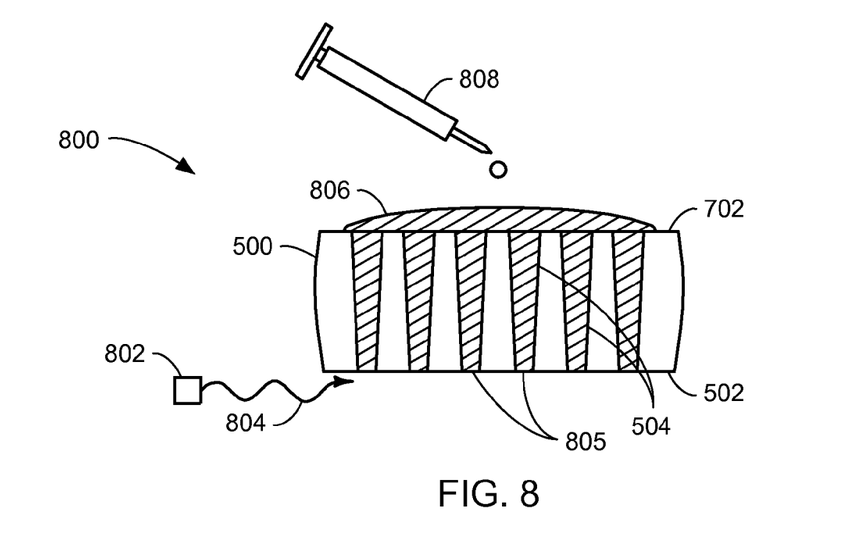
FIG. 8 is a cross-sectional view of the fragment shown in FIG. 7 during application of a clear coat and exposure to a side UV light.

Referring now to FIG. 8, therein is shown the structure of FIG. 7 after further processing. A side UV light 802 that is substantially parallel to the outer surface 502 is turned on from the side of the fragment 500, emitting side UV light 804 on the outer surface 502. The side UV light 804 should be sufficiently parallel to the outer surface 502 to prevent UV light 804 from entering the holes 504 and curing a clear coat 806 before the clear coat 806 reaches the outer surface 502. In this embodiment, the direction of the side UV light 804 is 0 degrees to the outer surface 502 of the fragment 500. Although 0 degrees to the outer surface 502 is preferred, the side UV light 804 could typically be, for example, between 0 and 10 degrees, depending upon the hole geometry.

The UV curable clear coat 806 is then applied to the inner surface 702 using, for example, a syringe dispensing station 808. The clear coat 806 flows through the holes 504 and the leading edge solidifies upon exposure to the side UV light 802 at the outer surface 502 of the fragment 500.

In this embodiment the clear coat 806 is applied to the inner surface 702 through the syringe dispensing station 808. The syringe dispensing station 808 is less than 1 mm from the inner surface 702 and applies a 3.9 psi pressure to push the clear coat 806 onto the holes 504. The viscosity range of the clear coat 806 is approximately 10-50 centi-poise. In this embodiment, the holes 504 are formed in aluminum, and there is a 1:3 ratio between the diameter of the holes 504 on the outer surface 502 and the diameter of the holes 504 on the inner surface 702. Thus, the diameter of the holes 504 on the outer surface 502 is about 30 microns and the diameter of the holes 504 on the inner surface 702 is about 90 microns.

It has been unexpectedly discovered that the side UV light 802 will quickly cure a surface 805 of the clear coat 806 just as it reaches the outer surface 502, thus cauterizing it to be uniform with the outer surface 502. In this context the term cauterize will therefore be understood and defined to mean solidifying or curing to form a surface that is solid, smooth, and generally free of imperfections such as cracks, facets, or blemishes. Thus the clear coat 806 has the characteristics, for example of a meniscus surface that is free of cracks, facets, or blemishes, and of having been formed and cauterized with the side UV light 804. The smooth and consistent outer surface 805 of the clear coat 806 in each of the holes 504 thus subsequently allows and facilitates the uniform, homogeneous transmission of visible light through the holes 504. In addition to improving light uniformity, the side UV light 804 reduces manufacturing time by allowing the viscosity of the clear coat 806 to be very low, and eliminating the need for an additional processing step to clean off fingers of clear coat following the curing thereof.

As will now be clear to those of skill in the art, based upon this disclosure, a major advantage of the present invention is that timing is not critical. That is, in prior embodiments, the flow variables had to be controlled to catch the clear coat just as it reached the opposite surface, and to start the cure before it emerged through the holes. That was difficult enough with uniform holes, and was made more difficult when flow rates varied from hole to hole. Now, with the present invention, each hole self-seals and stops flowing at the perfect moment when the clear coat reaches the surface and just before it emerges, preventing bleeding and run out. This allows the filling process to be greatly speeded up with very low viscosity or low surface tension material.

Figure 9:
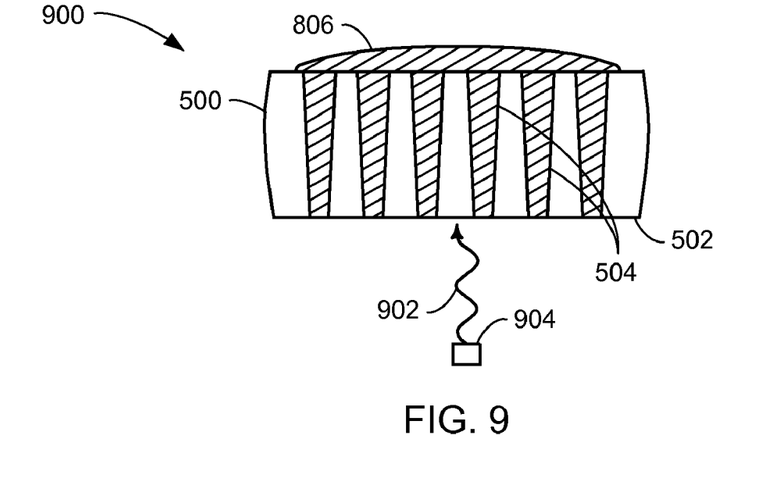
FIG. 9 is a cross-sectional view of the fragment shown in FIG. 8 after further processing to cure the clear coat within the holes.

Referring now to FIG. 9, therein is shown a cross sectional view 900 of the fragment 500 after further processing. The clear coat 806 is exposed to direct UV light 902 from a direct UV light emitter 904. The direct UV light emitter 904 produces light substantially parallel to the axes of the holes 504, beginning the curing process of the clear coat 806 in the interior of the holes 504. In the present embodiment, the clear coat 806 is exposed from the outer surface 502 of the fragment 500 for 8 seconds with a 13 mm, 100 W DC mercury vapor short arc lamp.

Figure 10:
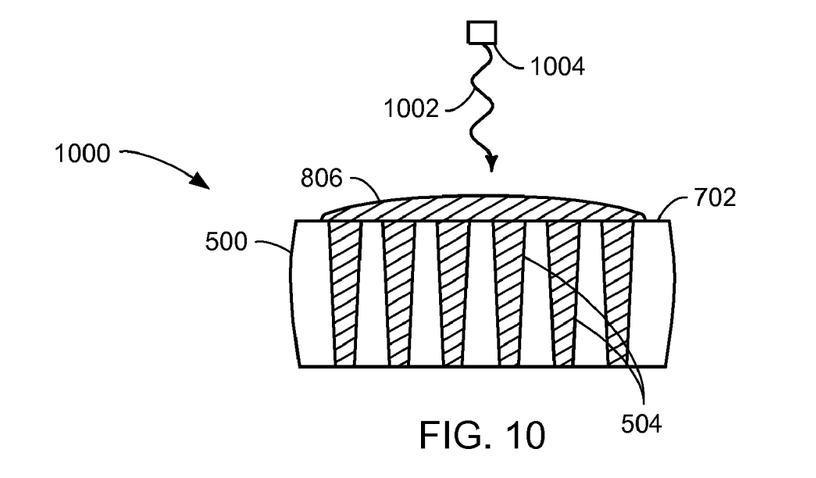
FIG. 10 is a cross-sectional view of the fragment shown in FIG. 9 during completion of the curing process.

Referring now to FIG. 10, therein is shown a cross sectional view 1000 of the fragment 500 after further processing. The clear coat 806 is exposed to a second direct UV light 1002 from a second direct UV light emitter 1004. The second direct UV light emitter 1004 produces light parallel to the holes 504, completing the curing process of the clear coat 806. Thus, for example, since the clear coat 806 is now solid and can no longer flow, the clear coat 806 has the characteristics of having been formed with the direct UV light 902 and 1002. In the present embodiment, the clear coat 806 is exposed from the inner surface 702 of the fragment 500 for 8 seconds with a 13 mm, 100 W DC mercury vapor short arc lamp.

In an alternate embodiment (not shown), a single UV light emitter may be used to cure the clear coat 806 in the interior of the holes 504. In that case, a multiple beam splitter may also be used to aim direct UV light at both the inner and outer surfaces 702 and 502.

Figure 11:
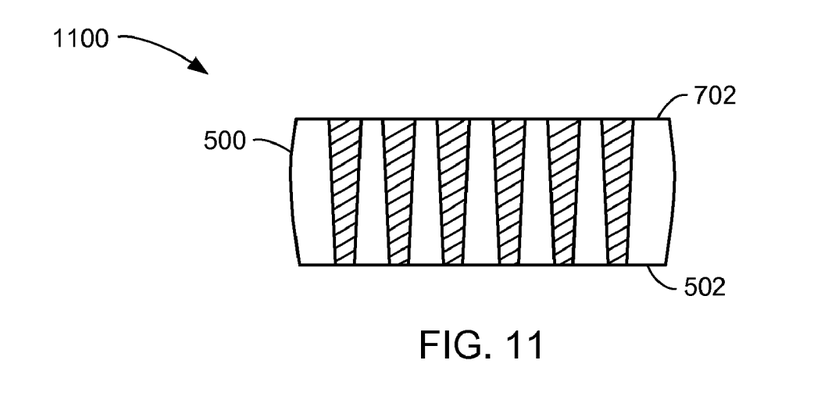
FIG. 11 is a cross-sectional view of the fragment shown in FIG. 10 after further processing that cleans the outer surface.

Referring now to FIG. 11, therein is shown a cross sectional view 1100 of the fragment 500 after further processing. The outer surface 502 of the fragment 500 is wiped and cleaned. In the present embodiment the outer surface 502 is cleaned with isopropyl alcohol or acetone. If desired for reasons such as clearance issues with other fixtures, excess of the clear coat 806 (FIG. 10) may be removed from the inner surface 702.

Of course, based on these teachings, it will now be clear to one of ordinary skill in the art that these various solutions may be combined. For example, suspended nano-particles may be combined with textured surrounding surfaces to provide even greater camouflage for the presence of the invisible holes.

It has also been unexpectedly discovered that various surface effects, such as simulated etching, can be achieved by combining differently sized holes, different hole spacings, different fillers, different light sources, different surface finishes, and combinations of these, as desired. According to the desired effect, it will now be understood, therefore, that larger, visible holes may be employed along with the invisible holes to achieve unexpected, sometimes dramatic effects. These effects include, for example, smooth shading, gradual or abrupt changes in texture, and so on, as the mix of these variable features changes from one location to another.

It will also be understood and appreciated by those of ordinary skill in the art, based on this disclosure, that the hole spacings and sizes, as suggested above, need not be as uniform as they are illustrated in the drawing figures. Variable spacings and sizes may be used to achieve effects, such as differences in texture, gradations in brightness, and so forth.

A significant advantage of the present invention that has been unexpectedly discovered is that embodiments that utilize holes of different (unequal) sizes can process the holes simultaneously to fill all the holes with clear coat at the same time. This is made possible by the present invention, even though differently sized holes fill at different rates and in different times, because each hole self-terminates the filling process precisely upon filling up. Self-termination occurs when the clear coat reaches the opposite surface and is cauterized, thereby stopping the flow of the clear coat at just the right time for each hole.

Another significant advantage of the present invention that has been unexpectedly discovered is that embodiments that utilize rough surfaces, including for example, anodized finishes that cause the holes to have different exit altitudes, can process the holes simultaneously to fill all the holes with the clear coat at the same time. As previously described, self-termination occurs when the clear coat reaches the opposite surface and is cauterized. Thus the present invention automatically mimics the surface topography, so that each hole is custom cured.

Figure 12:
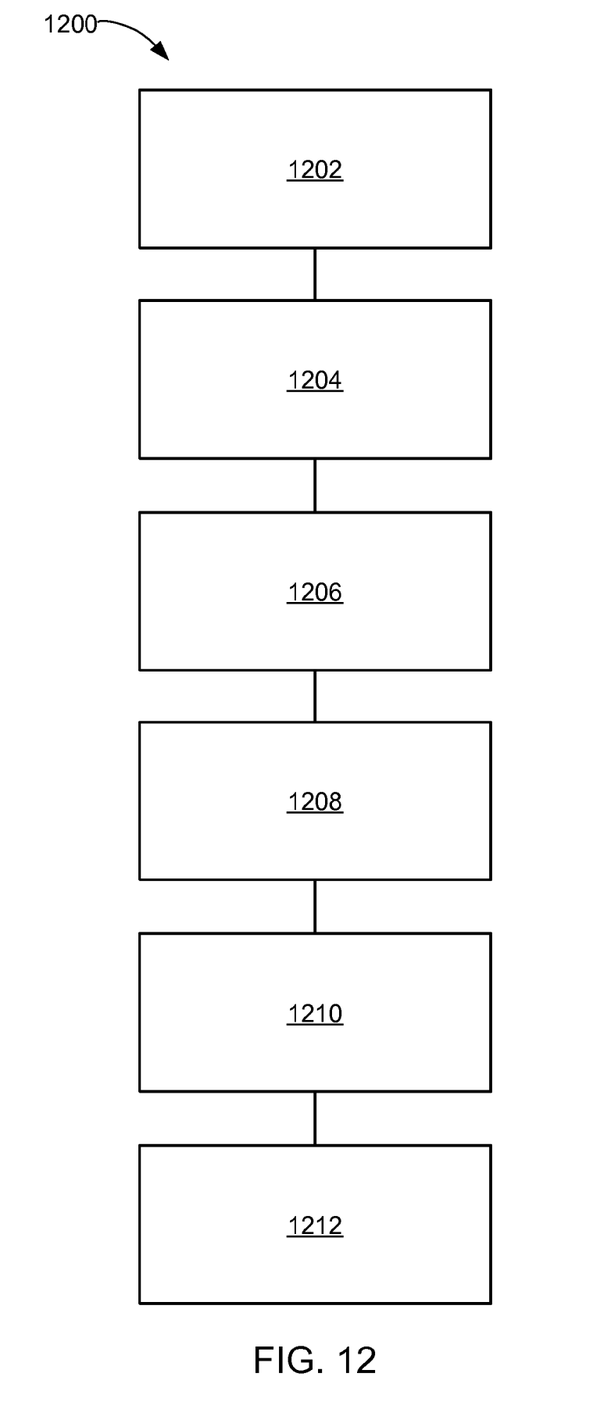
FIG. 12 is a flow chart of a process for manufacturing an invisible, light-transmissive display system in accordance with an embodiment of the present invention.

Referring now to FIG. 12, therein is shown a flow chart of a process 1200 for manufacturing an invisible, light-transmissive display system 1200 in accordance with an embodiment of the present invention. The system 1200 includes providing a light resistant material in a block 1202; penetrating substantially invisible holes between the first surface and the second surface in a predetermined light-transmissive display pattern in a block 1204; exposing the second surface to a side curing light that is substantially parallel to the second surface at the invisible holes thereadjacent in a block 1206; applying a light-conducting curable filler into the invisible holes from the first surface in a block 1208; curing surfaces of the light-conducting curable filler in the invisible holes at the second surface with the side curing light in a block 1210; and curing the remaining curable filler in the invisible holes in a block 1212.

It has been discovered that the present invention thus has numerous aspects.

A principle aspect that has been unexpectedly discovered is that the system of the present invention can economically reduce manufacturing steps while increasing uniformity and quality of invisible display systems. For example, a wipe step to remove excess cured material is no longer required.

Another aspect is that the system of the present invention homogeneously transmits visible light, thus unobtrusively providing highly effective, uniform, aesthetically pleasing, and highly desirable surface displays.

Another aspect is that the present invention provides a uniform outer surface that is free of cracks, facets, or blemishes in the clear coat.

Another aspect is that the present invention decreases manufacturing time by allowing the use of a very low viscosity clear coat.

Another aspect is that the present invention uniformly fills holes of unequal sizes simultaneously and timing is not critical.

Yet another important aspect of the system of the present invention is that it valuably supports and services the historical trend of reducing costs, simplifying systems, and increasing performance.

These and other valuable aspects of the present invention consequently further the state of the technology to at least the next level.

Thus, it has been discovered that the invisible, light-transmissive display system of the present invention furnishes important and heretofore unknown and unavailable solutions, capabilities, and functional aspects for display systems for electronic and other devices. The resulting configurations are straightforward, cost-effective, uncomplicated, aesthetically pleasing and attractive, highly versatile and effective, can be surprisingly and unobviously implemented by adapting known technologies, and are thus readily suited for efficiently and economically manufacturing highly desirable and appealing invisible display systems.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

The invention claimed is:

1. A method of manufacturing an invisible, light-transmissive display system, comprising:
   providing a light resistant material with a first surface and a second surface;
   penetrating substantially invisible holes between the first surface and the second surface in a predetermined light-transmissive display pattern;
   exposing the second surface to a side curing light that is substantially parallel to the second surface at the invisible holes thereadjacent;
   applying a light-conducting curable filler into the invisible holes from the first surface;
   curing surfaces of the light-conducting curable filler in the invisible holes at the second surface with the side curing light; and
   curing the remaining curable filler in the invisible holes.

2. The method as claimed in claim 1 wherein curing the surfaces of the curable filler comprises cauterizing the surfaces of the curable filler.

3. The method as claimed in claim 1 wherein the direction of the side curing light is between 0 and 10 degrees to the second surface of the light resistant material.

4. The method as claimed in claim 1 wherein applying a light-conducting curable filler comprises applying the light-conducting curable filler with a dispensing station.

5. The method as claimed in claim 1 wherein the side curing light is 0 degrees to the second surface of the light resistant material.

6. The method as claimed in claim 1 wherein applying a light-conducting curable filler into the invisible holes comprises applying a UV curable clear coat into the invisible holes.

7. The method as claimed in claim 1 wherein curing surfaces of the light-conducting curable filler further comprises forming the surfaces of the light-conducting curable filler to be uniform with the second surface and substantially free of cracks, facets, or blemishes.

8. The method as claimed in claim 1 wherein exposing the second surface to a side curing light comprises exposing the second surface to a side UV light.

9. The method as claimed in claim 1 further comprising curing the remaining curable filler with direct UV light.

10. A method of manufacturing an invisible, light-transmissive display system, comprising:
    providing a light resistant metallic, plastic, or coated material with an inner surface and an outer surface;
    penetrating substantially invisible holes between the inner surface and the outer surface in a predetermined light-transmissive display pattern;
    exposing the outer surface to a side curing light that is substantially parallel to the second surface at the invisible holes thereadjacent;
    applying a light-conducting curable filler into the invisible holes from the inner surface;
    curing surfaces of the light-conducting curable filler in the invisible holes at the outer surface with the side curing light; and
    curing the remaining curable filler in the invisible holes with at least a direct light, wherein the direct light is directed into and substantially through the holes.

11. The method as claimed in claim 10 wherein curing the surfaces of the curable filler comprises cauterizing the surfaces of the curable filler.

12. The method as claimed in claim 10 wherein the direction of the side curing light is between 0 and 10 degrees to the outer surface of the light resistant material.

13. The method as claimed in claim 10 wherein applying a light-conducting curable filler comprises applying the light conducting curable filler with a syringe dispensing station.

14. The method as claimed in claim 10 wherein the side curing light is 0 degrees to the outer surface of the light resistant material.

15. The method as claimed in claim 10 wherein applying a light-conducting curable filler into the invisible holes comprises applying a UV curable clear coat into the invisible holes.

16. The method as claimed in claim 10 wherein curing surfaces of the light-conducting curable filler further comprises forming the surfaces of the light-conducting curable filler to be uniform with the outer surface and with a meniscus surface that is substantially free of cracks, facets, or blemishes.

17. The method as claimed in claim 10 wherein exposing the outer surface to a side curing light comprises exposing the outer surface to a side UV light.

18. The method as claimed in claim 10 further comprising curing the remaining curable filler with direct UV light.

19. An invisible, light-transmissive display system, comprising:
   light resistant material with a first surface and a second surface;
   substantially invisible holes penetrating between the first surface and the second surface in a predetermined light-transmissive display pattern; and
   a light-conducting cured filler in the invisible holes having the characteristics of having been formed with a side curing light.

20. The system as claimed in claim 19 wherein the light conducting cured filler has the characteristics of having been cauterized.

21. The system as claimed in claim 19 wherein the light-conducting cured filler has the characteristics of having been formed with a side curing light between 0 and 10 degrees to the second surface of the light resistant material.

22. The system as claimed in claim 19 wherein the substantially invisible holes are conical.

23. The system as claimed in claim 19 wherein the light-conducting cured filler has the characteristics of having been formed with a side curing light 0 degrees to the second surface of the light resistant material.

24. The system as claimed in claim 19 wherein the light-conducting cured filler in the invisible holes comprises a UV curable clear coat.

25. The system as claimed in claim 19 wherein surfaces of the light-conducting curable filler are uniform with the second surface and substantially free of cracks, facets, or blemishes.

26. The system as claimed in claim 19 wherein the light-conducting cured filler has the characteristics of having been formed on the second surface with a side UV light.

27. The system as claimed in claim 19 wherein the light-conducting cured filler has the characteristics of having been formed with direct UV light.

28. An invisible, light-transmissive display system, comprising:
   a light resistant metallic, plastic, or coated material with an inner surface and an outer surface;
   substantially invisible holes penetrating between the inner surface and the outer surface in a predetermined light-transmissive display pattern; and
   a light-conducting cured filler in the invisible holes having the characteristics of having been formed with a side curing light and a direct light.

29. The system as claimed in claim 28 wherein the light conducting cured filler has the characteristics of having been cauterized.

30. The system as claimed in claim 28 wherein the light-conducting cured filler has the characteristics of having been formed with a side curing light between 0 and 10 degrees to the outer surface of the light resistant material.

31. The system as claimed in claim 28 wherein the substantially invisible holes are conical.

32. The system as claimed in claim 28 wherein the light-conducting cured filler has the characteristics of having been formed with a side curing light 0 degrees to the outer surface of the light resistant material.

33. The system as claimed in claim 28 wherein the light-conducting cured filler in the invisible holes comprises a UV curable clear coat.

34. The system as claimed in claim 28 wherein surfaces of the light-conducting curable filler are uniform with the outer surface and with a meniscus surface that is substantially free of cracks, facets, or blemishes.

35. The system as claimed in claim 28 wherein the light-conducting cured filler has the characteristics of having been formed on the outer surface with a side UV light.

36. The system as claimed in claim 28 wherein the light-conducting cured filler has the characteristics of having been formed with direct UV light.

* * * * *